United States Patent [19]

Whalen

[11] Patent Number: 5,476,307

[45] Date of Patent: Dec. 19, 1995

[54] INERTIA HINGE FOR SEATBACK AND ARMREST

[75] Inventor: John F. Whalen, Macomb, Mich.

[73] Assignee: Fisher Dynamics Corporation, St. Clair Shores, Mich.

[21] Appl. No.: 188,916

[22] Filed: Jan. 31, 1994

[51] Int. Cl.⁶ .................................................. B60N 2/02
[52] U.S. Cl. ................ 297/378.11; 297/378.14; 297/411.32
[58] Field of Search ............... 297/378.11, 378.12, 297/378.14, 411.32

[56] References Cited

U.S. PATENT DOCUMENTS

| | | |
|---|---|---|
| Re. 31,741 | 11/1984 | Strowick et al. . |
| 2,737,229 | 6/1956 | Semar . |
| 2,864,432 | 12/1958 | Limberg . |
| 2,873,794 | 2/1959 | Leslie et al. . |
| 3,405,971 | 10/1968 | Kobrehel . |
| 3,514,155 | 5/1970 | Close . |
| 3,549,202 | 12/1970 | Boschen et al. . |
| 3,628,831 | 12/1971 | Close . |
| 4,010,979 | 3/1977 | Fisher et al. . |
| 4,045,079 | 8/1977 | Arlauskas et al. . |
| 4,082,353 | 4/1978 | Hollowell . |
| 4,143,913 | 3/1979 | Rumpf . |
| 4,147,386 | 4/1979 | Stolper . |
| 4,165,128 | 8/1979 | Strowick et al. . |
| 4,219,234 | 8/1980 | Bell . |
| 4,223,946 | 9/1980 | Kluting . |
| 4,252,370 | 2/1981 | Kluting et al. . |
| 4,294,488 | 10/1981 | Pickles . |
| 4,318,569 | 3/1982 | Bilenchi et al. . |
| 4,365,837 | 12/1982 | Mizelle . |
| 4,390,208 | 6/1983 | Widmer et al. . |
| 4,402,547 | 9/1983 | Weston et al. . |
| 4,429,919 | 2/1984 | Klueting et al. . |
| 4,518,190 | 5/1985 | Klüting et al. . |
| 4,591,207 | 5/1986 | Nithammer et al. . |
| 4,634,182 | 1/1987 | Tanaka . |
| 4,846,526 | 7/1989 | Allen . |
| 4,909,571 | 3/1990 | Vidwans et al. . |
| 4,928,374 | 5/1990 | Allen . |
| 4,978,170 | 12/1990 | Pelz et al. . |
| 5,163,735 | 11/1992 | Aljundi . |
| 5,163,736 | 11/1992 | Aljundi . |
| 5,248,184 | 9/1993 | Morris . |
| 5,265,937 | 11/1993 | Allen . |

*Primary Examiner*—Laurie K. Cranmer
*Attorney, Agent, or Firm*—Harness, Dickey & Pierce

[57] ABSTRACT

An inertia sensitive hinge mechanism allows rotation of a first hinge member relative to a second hinge member about a pivot during normal use and prevents rotation about the pivot when predetermined deceleration forces are present. The inertia sensing latching assembly includes an inertial actuator operatively connected to and rotatable with respect to the second hinge member. The inertial actuator includes first and second cam surfaces and a wedging surface located therebetween. The inertial actuator has a center of gravity spaced from a center of rotation. A first positioning device connected to the first hinge member positions the inertial actuator by sliding engagement with the first cam surface as the first hinge member rotates in an opposite direction when the predetermined forces are not present. A second positioning device connected to the first hinge member positions the inertial actuator by sliding engagement with the second cam surface as the first hinge member further rotates in the opposite direction when the predetermined deceleration forces are not present. When the deceleration forces are present, the first hinge member initially rotates in the opposite direction, and the inertial actuator is positioned by the predetermined deceleration forces such that the wedging surface engages the second positioning device preventing further rotation of the first hinge member in the opposite direction.

14 Claims, 2 Drawing Sheets

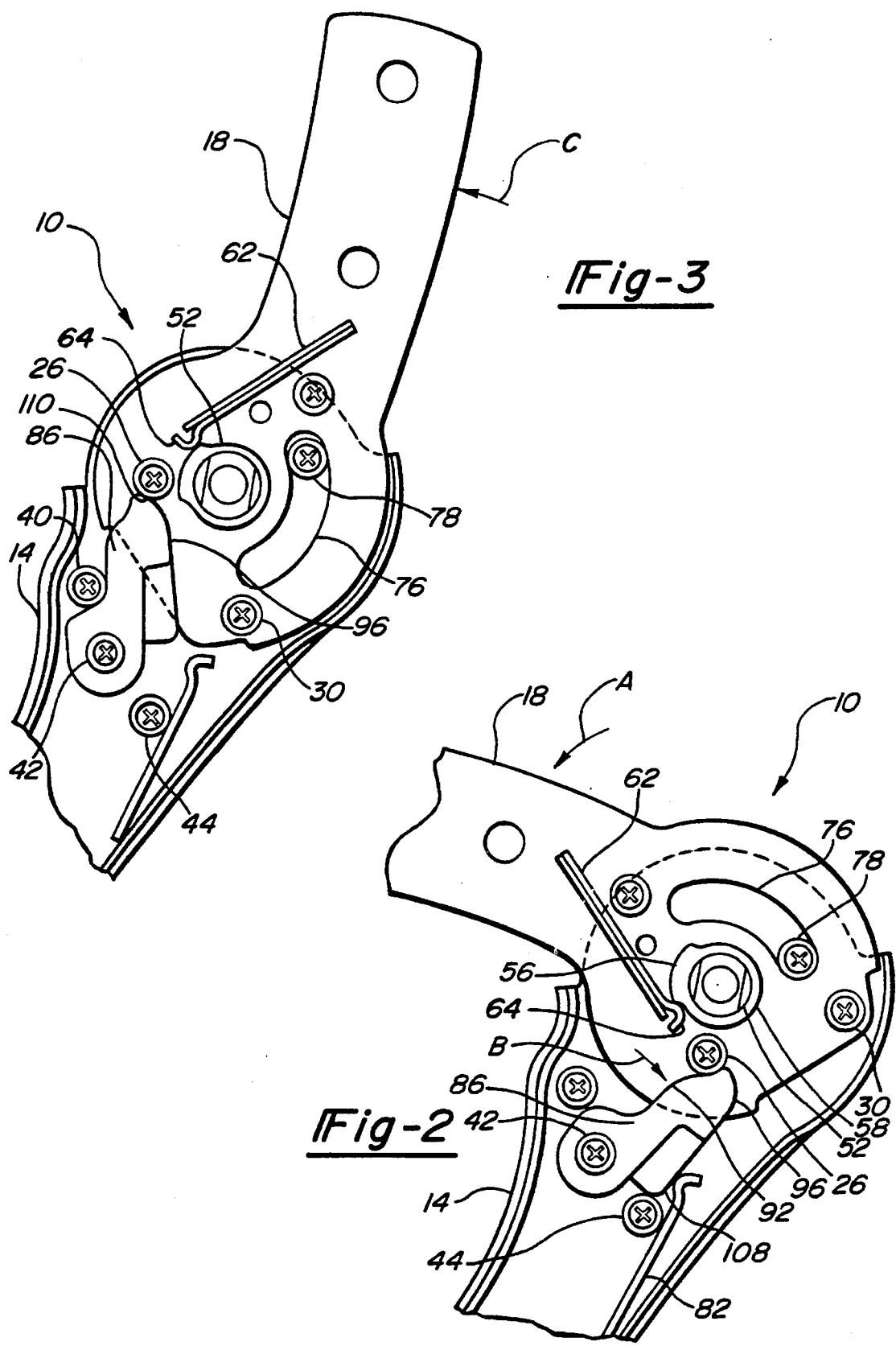

INERTIA HINGE FOR SEATBACK AND ARMREST

BACKGROUND OF THE INVENTION

1. Technical Field

This invention relates generally to a hinge for folding armrests or center passenger seats of the type used in passenger vehicles and, more particularly, to a hinge mechanism having an inertia sensitive latch assembly which permits the armrest or center passenger seat to be folded forward during normal use but which locks to prevent folding when the vehicle is subjected to predetermined deceleration forces exceeding a predetermined threshold level.

2. Discussion

As is known, passenger vehicles commonly include one or more armrests located between adjacent seats such as, for example, between driver and passenger portions of a bench seat. The seat occupants can move the armrest between a stowed position in which the armrest is concealed within or abuts the seatback and a deployed position in which the armrest is folded out to rest against the seat bottom. Alternatively, passenger vehicles commonly include a center passenger seat located between the driver and passenger seats. The center passenger seat can similarly be moved between a stowed position and a deployed position.

Typically, the armrest or center passenger seat includes a pair hinges supporting opposite sides thereof for pivotable movement between the stowed and deployed positions. Each hinge includes upper and lower hinge members with the upper hinge member rotating with respect to the lower hinge member about a pivot. More particularly, the upper hinge member is typically connected to an upholstered armrest cushion or seat cushion while the lower hinge members is connected to the frame structure of the vehicle seat or vehicle floor.

While conventional armrests are provided to enhance the comfort of the seat occupants and conventional folding center passenger seats provide additional passenger seating, they can unexpectedly move from the stowed position toward the deployed position during a sudden vehicular deceleration condition, for example caused by a frontal collision or heaving braking of the motor vehicle. If a seat occupant is sitting in between the driver and passenger seats, such a deceleration can cause the armrest or folding center passenger seat to strike the passenger which may cause injury. Additionally, unexpected movement of the armrest or folding center passenger seat from the stowed position toward the deployed position can occur more frequently as the hinges wear and become loose. Therefore, a hinge for use in folding armrests or center passenger seats that addresses the above problems by providing means for inhibiting such unexpected movement is desirable.

Although inertia-sensitive hinge mechanism incorporating some of the above-noted features are commercially available and perform satisfactorily for this intended purpose, a need exists to provide continuous improvement in this field of technology for reducing overall system complexity and costs while concomitantly enhancing operational reliability and durability.

SUMMARY OF THE INVENTION

Accordingly, the present invention is directed to providing an improved hinge mechanism of the type having an inertia sensitive latching assembly.

The inertia sensitive hinge mechanism allows rotation of a first hinge member relative to a second hinge member about a pivot during normal use and prevents rotation about the pivot when predetermined deceleration forces are present. The inertia sensing latching assembly includes an inertial actuator operatively connected to and rotatable with respect to the second hinge member. The inertial actuator includes first and second cam surfaces and a wedging surface located therebetween. The inertial actuator has a center of gravity spaced from its center of rotation. A first positioning device connected to the first hinge member allows the inertial actuator to rotate in a first direction by sliding engagement with the first cam surface as the first hinge member rotates in a second or opposite direction when the predetermined forces are not present. A second positioning device connected to the first hinge member positions the inertial actuator by sliding engagement with the second cam surface as the first hinge member continues to rotate in the second direction when the predetermined deceleration forces are not present. However, when deceleration forces exceeding the predetermined level are present, the first hinge member initially rotates in the second direction and the inertial actuator also rotates in the second direction due to the predetermined deceleration forces such that the wedging surface engages the second positioning device, therefore preventing further rotation of the first hinge member in the second direction.

In another feature of the present invention, the center of gravity of the inertial actuator is located above and horizontally rearward of its center of rotation.

In yet another feature of the invention, a guide means is provided between the first and second hinge members for guiding rotation of the first hinge member with respect to the second hinge member. The guide includes an arcuate cam surface formed in the first hinge member, and a rivet or pin extending from the second hinge member and which is received in the arcuate cam surface of the first hinge member.

In still another feature of the invention, the inertia sensitive hinge mechanism includes a detent connected to the pivot for providing first and second detent surfaces. A spring contacts the first and second detent surfaces to increase force initially required to rotate the first hinge member from a stowed position towards a deployed position and to increase the force required to initially rotate the first hinge member from the deployed position towards the stowed position.

Additional benefits and advantages of the present invention will become apparent to those skilled in the art after studying the following specification and appended claims taken in conjunction with the accompanying drawings.

BRIEF DESCRIPTION OF THE DRAWINGS

FIG. 2 is a partial side elevational view of the inertia-sensitive hinge mechanism of FIG. 1 with an upper hinge member rotated toward a "deployed" position and an inertial actuator maintained in a disengaged position; and FIG. 3 is a partial side elevational view of the inertia-sensitive hinge mechanism of FIG. 1 with the inertial actuator shown in an engaged position due the hinge mechanism being subjected to deceleration forces exceeding a predetermined threshold level.

DESCRIPTION OF THE PREFERRED EMBODIMENT

Figure 1:
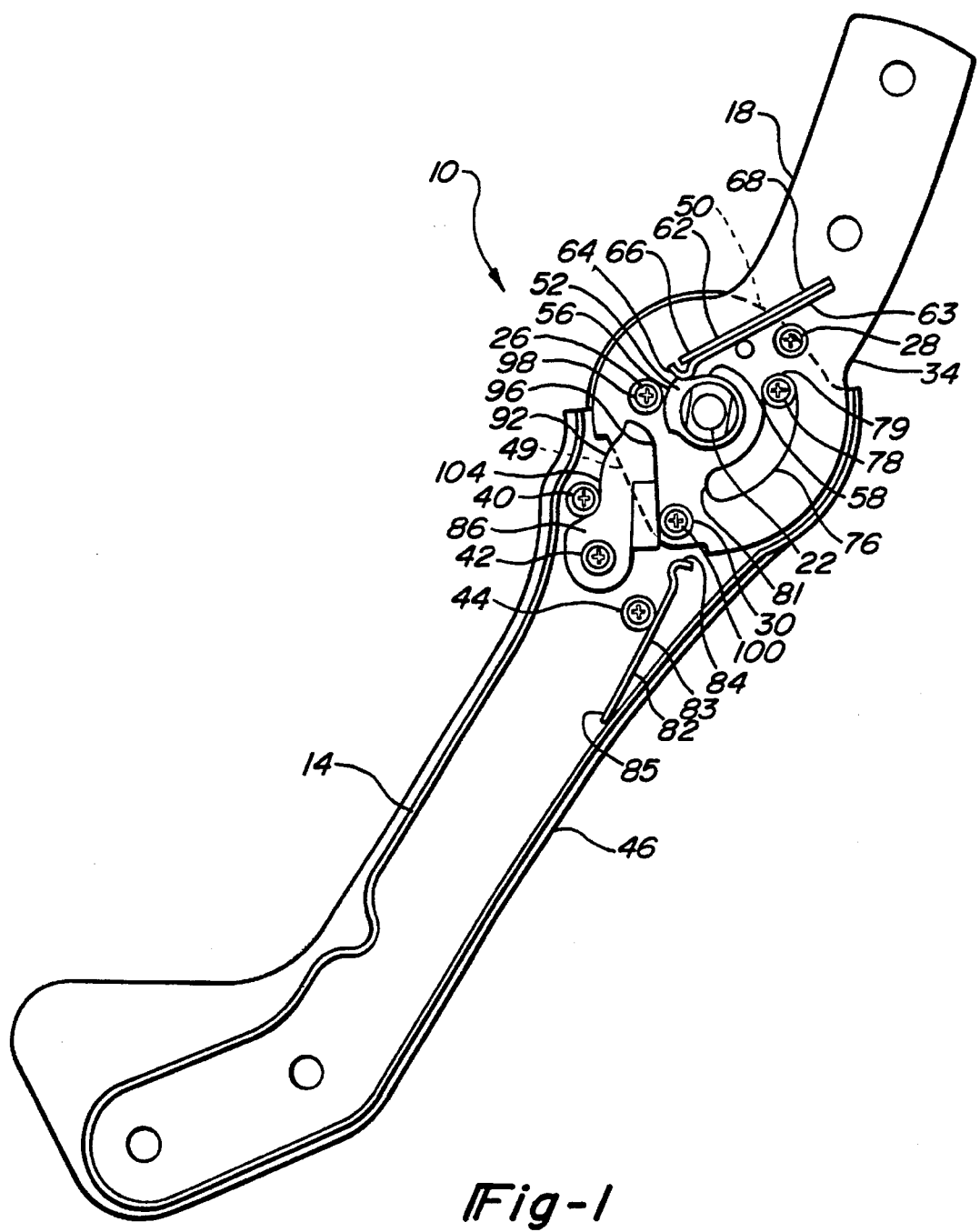
FIG. 1 is a side elevational view of an inertia-sensitive hinge mechanism in accordance with a preferred embodiment of the present invention and shown in a "stowed" position.

It should be understood from the outset that the present invention will be described in connection with an armrest hinge which illustrates the best mode of practicing the invention at the time this application was filed. However, it is contemplated that the inertia-sensitive hinge mechanism of the present invention may also be readily adapted for use in seat hinge applications, particularly for use with folding center passenger seats. Other modifications will become apparent to those skilled in the art after having the benefit of studying the text, drawings and claims which follow this detailed specification. With that in mind, attention should now be turned to FIG. 1.

An armrest hinge mechanism 10 according to a preferred embodiment of the present invention and illustrated in the drawings is intended to be positioned at a left-hand side of an armrest assembly (not shown) of the type commonly associated with a motor vehicle seat (not shown). An armrest hinge mechanism for a right-hand side would preferably be a mirror image of armrest hinge mechanism 10 disclosed herein. Armrest hinge mechanism 10 includes a lower hinge member 14 which can be attached to a seat frame, floor pan, etc. of the motor vehicle and an upper hinge member 18 which can be attached to an upholstered armrest cushion. In general, hinge mechanism 10 is adapted to permit the armrest cushion to be pivotably moved between a "stowed" position concealed within or adjacent a seatback portion of the vehicle seat and a "deployed" position adjacent a seat cushion portion of the vehicle seat.

Upper hinge member 18 rotates with respect to lower hinge member 14 about a pivot 22. Lower and upper hinge members 14 and 18 can be fabricated by matingly attaching a pair of flanged brackets or plates using rivets, welding, etc., whereby the plates define a space therebetween to accommodate additional components described below. For example, upper hinge member 18 includes rivets 26, 28 and 30 for interconnecting plates 34 (one shown), and lower hinge member 14 includes rivets 40, 42 and 44 for interconnecting plates 46 (one shown). As will be appreciated, mating sets of plates 34 and 46 can be mirror image components. Plate 34 of upper hinge member 18 define a first opening 49 and plates 46 of lower hinge member 14 define a second opening 50. Preferably second opening 50 encloses first opening 49 as upper hinge member 18 pivots to fully enclose components located therebetween and prevent entry of foreign particles.

Pivot 22 includes a detent 52 located on an outer circumference thereof which defines a raised portion 56 and a lowered portion 58. A cantilevered spring 62 abuts lowered portion 58 when in the stowed and deployed positions to maintain a load on inertial hinge mechanism 10 and abuts raised portion 56 when in between the stowed and deployed positions. Detent 52 provides passengers with a positive feel when armrest hinge mechanism 10 is fully in either the deployed or stowed position. Cantilevered spring 62 includes a straight section 63 which terminates in a curved end 64 and a straight reinforcing section 66 longitudinally abutting straight section 63. In addition, adjacent ends 68 of both sections 63 and 66 are attached to upper hinge member 18. Cantilevered spring 62 can be made of metal, plastic or any other flexible resilient material.

Upper hinge member 18 includes an arcuate cam surface 76 on opposing plates 34 for receiving a pin 78 connected between opposing plates 46 of lower hinge member 14. As can be appreciated, arcuate cam surface 76 can be located on lower hinge member 14 and pin 78 can be located on upper hinge member 18. Pin 78 travels between first and second edges 79 and 81 to restrict rotation of armrest hinge mechanism 10 between the stowed and deployed positions.

A cantilevered spring 82 includes a straight section 83 terminating in a curved end 84 and is connected on lower hinge member 14 adjacent an end 85 thereof. Again, spring 82 can likewise be fabricated from metal, plastic, or any other suitable flexible resilient material. An inertial actuator 86 is connected to lower hinge member 14 for pivotable movement about rivet 42. Inertial actuator 86 is adapted to rotate in a clockwise direction when said predetermined deceleration forces are not present and in a counter-clockwise direction when said predetermined deceleration forces are present. Inertial actuator 86 includes a cam surface 96 and an opposing cam surface 92. Preferably, inertial actuator 86 has a center of gravity that is located above and horizontally spaced from its center of rotation (i.e. rivet 42).

Upper hinge member 18 includes first and second means 100 and 98 for positioning inertial actuator 86 as armrest hinge mechanism 10 is rotated between stowed and deployed positions. First and second positioning means 100 and 98 can be rivets 30 and 26 which connect plates 34 and position inertial actuator 86 (thus reducing parts needed).

Arm rest hinge mechanism 10 is shown in FIG. 1 in the stowed position. In this position, curved end 64 of spring 62 rests on lowered portion 58 adjacent raised portion 56, and pin 78 abuts first edge 79 of arcuate cam surface 76. In addition, rivet 30 rests against cam surface 96 and rivet 40 rests against a lower portion 104 of opposing cam surface 92.

When deceleration forces exceeding a predetermined level are not present and a seat occupant rotates the armrest assembly via armrest hinge mechanism 10 from the stowed position towards the deployed position (in a direction indicated by arrow "A" in FIG. 2), upper hinge member 18 rotates and pin 78 moves with respect to arcuate cam surface 76. Sufficient force must be provided to resiliently bend spring 62 to allow curved end 64 to bend over raised portion 56 of detent 52. Once this bending force is reached, curved end 64 will slide over raised portion 56 with a lower applied force. Since the center of gravity of inertial actuator 86 is above and horizontally spaced from the center of rotation defined by rivet 42, inertial actuator 86 rotates clockwise (in a direction indicated by arrow "B" in FIG. 2) with cam surface 96 sliding across rivet 30.

As the seat occupant continues to rotate the armrest hinge mechanism 10 toward the deployed position shown in FIG. 2, rivet 26 slidingly engages opposing cam surface 92 of inertial actuator 86 and rivet 30 rotates off cam surface 96. In addition, curved end 64 rotates off raised portion 56 onto lowered portion 58 and rivet 26 biases a lower portion 108 of cam surface 96 into spring 82 and rivet 44. As can be appreciated, inertial actuator 86 is captively held by rivet 26 and spring 82 to prevent rattling. Alternately, a bushing can be provided around rivet 44 instead of spring 82.

When deceleration forces exceeding the predetermined level are present, upper hinge member 18 initially rotates slightly (in a direction of arrow "C" in FIG. 3) from the stowed position toward the deployed position. Normally, inertial actuator 86 would rotate clockwise due to the force of gravity. However, since the center of gravity of actuator 86 is located above and horizontally spaced from its center of rotation, the deceleration forces generate a torque load on inertial actuator 86 in the counter-clockwise direction. Thus, when upper hinge member 18 attempts to continue rotating forwardly, rivet 26 engages an upper sloped portion 110 of cam surface 96 and wedges inertial actuator 86 against rivet 40, thereby preventing subsequent further rotation of upper hinge member 18 and armrest hinge mechanism 10.

As can be appreciated, armrest hinge mechanism 10 according to the invention fully encloses hinge components located therebetween preventing entry of dirt and other foreign particles which can cause moving parts to corrode and/or freeze. Inertial actuator 86 is engaged in both the stowed and the deployed positions thus preventing rattling and vibration which causes undesirable noise. Moreover, detent 52 tends to keep the armrest in either the deployed or stowed position during normal driving conditions. Armrest hinge mechanism 10 has very few parts thus decreasing costs associated with manufacture and materials. Inertial actuator 86 moves between two positions when the arm rest is moved between the deployed and stowed positions which prevents inertial actuator 86 from freezing in place. Other features and advantages are readily apparent.

In use, armrest hinge mechanism 10 is normally positioned as shown in FIG. 1 with upper hinge member 18 and armrest hinge mechanism 10 in the stowed position. If a seat occupant desires use of the armrest, upper hinge member 18 is pivoted forward toward the deployed position shown in FIG. 2. The armrest can be returned to the stowed position by simply moving upper hinge member 18 into the upright position. However, when the armrest is in the stowed position and the vehicle experiences deceleration forces above the predetermined threshold level, inertial actuator 86 engages rivet 26 to prevent forward pivoting of upper hinge member 18. When the armrest is in the deployed position and the vehicle experiences deceleration forces above the predetermined threshold level, the armrest remains in the deployed position and inertial actuator 86 is held by rivet 26 against rivet 44 and spring 82.

While the above description constitutes the preferred embodiment of the present invention, it is to be understood that the invention is readily susceptible to modification, variation and change without departing from the proper scope and fair meaning of the accompanying claims.

What is claimed is:

1. In an inertia sensitive hinge mechanism allowing rotation of a first hinge member relative to a second hinge member about a means for pivoting during normal use and preventing rotation about said pivoting means when predetermined deceleration forces are present, an inertia sensing latching assembly comprising:

an inertial actuator operatively connected to and rotatable with respect to said second hinge member and including first and second cam surfaces and a wedging surface located therebetween, wherein said inertial actuator has a center of gravity spaced from a center of rotation;

first positioning means connected to said first hinge member for allowing said inertial actuator to rotate in one direction through sliding engagement with said first cam surface as said first hinge member rotates in an opposite direction when said predetermined forces are not present; and second positioning means connected to said first hinge member for rotating said inertial actuator further in said one direction through sliding engagement with said second cam surface as said first hinge member further rotates in said opposite direction when said predetermined deceleration forces are not present, wherein, when said deceleration forces are present, said first hinge member initially rotates in said opposite direction, and said inertial actuator rotates in said opposite direction due to said predetermined deceleration force such that said wedging surface engages said second positioning means preventing further rotation of said first hinge member in said opposite direction.

2. The inertia sensing latch assembly of claim 1 wherein said center of gravity is located above and horizontally offset from said center of rotation such that said initial actuator is normally adopted to rotate in said one direction.

3. The inertia sensing latch assembly of claim 1 wherein said first positioning means includes a first rivet extending from said first hinge member.

4. The inertia sensing latch assembly of claim 1 wherein said second positioning means includes a second rivet extending from said first hinge member.

5. The inertia sensing latch assembly of claim 1 further comprising guiding means on said first and second hinge members for guiding rotation of said first hinge member with respect to said second hinge member.

6. The inertia sensing latch assembly of claim 5 wherein said guiding means includes an arcuate cam surface formed in said first hinge member, wherein said second hinge member includes a rivet extending outwardly therefrom, and wherein said rivet is received in said arcuate cam surface of said first hinge member.

7. The inertia sensing latch assembly of claim 1 further comprising:

detent means connected to said pivot means for providing first and second detent surfaces; and spring means for contacting said first and second detent surfaces to increase force initially required to rotate said first hinge member from a stowed position towards a deployed position and to increase force required to initially rotate said first hinge member from said deployed position towards said stowed position.

8. The inertia sensing latch assembly of claim 7 wherein said spring means is formed by a straight section terminating in a curved end and a second section longitudinally abutting said straight section.

9. The inertia sensing latch assembly of claim 8 wherein adjacent ends of said straight and second sections are attached to said first hinge member.

10. The inertia sensing latch assembly of claim 1 further comprising a first inertial stop connected to said second hinge member, wherein said first positioning means forces a lower portion of said second cam surface of said inertial actuator against said first inertial stop when said armrest is in a stowed position to prevent movement of said inertial actuator.

11. The inertia sensing latch assembly of claim 1 further comprising a second inertial stop and a spring connected to said second hinge member, wherein said second positioning means forces a lower portion of said first cam surface of said inertial actuator against said spring and said second inertial stop when said armrest is in a deployed position to prevent vibrational movement of said inertial actuator.

12. The inertia sensing latch assembly of claim 1 wherein said first hinge member and said second hinge member correspond to upper and lower hinge members of an inertia sensitive armrest hinge.

13. The inertia sensitive hinge of claim 1 wherein said improved inertia sensing hinge is incorporated into a vehicle seat hinge mechanism.

14. The inertia sensing latch assembly of claim 1 wherein said improved inertia sensing hinge is incorporated into an armrest hinge mechanism.

* * * * *